3,485,887
PROCESS FOR THE TREATMENT BY HYDROGENATION OF C₄-HYDROCARBONS CONTAINING BUTADIENE AND N-BUT-1-ENE
Walter Kronig, Wilhelm Mayrhofer, Gerhard Scharfe, and Wulf Schwerdtel, Leverkusen, and Kurt Halcour, Cologne-Stammheim, Germany, assignors to Farbenfabriken Bayer Aktiengesellschaft, Leverkusen, Germany, a corporation of Germany
No Drawing. Filed May 29, 1967, Ser. No. 642,194
Claims priority, application Germany, June 15, 1966, F 49,472
Int. Cl. C07c $5/16$, $5/06$
U.S. Cl. 260—677          10 Claims

ABSTRACT OF THE DISCLOSURE

The selective hydrogenation and simultaneous isomerization of $C_4$-hydrocarbon mixtures containing butadiene and n-butene-1, whereby converting the butene-1 to butene-2 and partially hydrogenating the butadiene to butene-2. The hydrogenation is carried out in the liquid phase by passing the $C_4$-fractions downwardly close a fixed bed hydrogenation catalyst in a hydrogen atmosphere with a temperature profile across the length of the hydrogenation zone such that the $C_4$-fraction inlet temperature is about 10 to 35° C. and the outlet temperature of the liquid, mainly butene-2 fractions, is about 60 to 90° C.

---

This invention relates to a process for the treatment by hydrogenation of $C_4$-hydrocarbons containing butadiene and n-but-1-ene.

The thermal cracking of mineral oils or mineral oil fractions leads interalia to the formation of a hydrocarbon fraction largely comprising hydrocarbons with four carbon atoms ($C_4$-fractions). Such fractions mostly contain butane, butenes and various proportions of butadiene. $C_4$-fractions of relatively high butadiene content are formed, in particular, when cracking is carried out under relatively severe conditions, i.e. at temperatures in the range from 600 to 900° C. In this type of cracking process, known as pyrolysis, the $C_4$-fraction generally contains so much butadiene that it is worth recovering the butadiene from the fraction. In some uses of the $C_4$-fraction, the butadiene present in it has a disturbing effect, so that as much as possible of this compound has to be removed before the $C_4$-fraction can be further processed or used. Even if the original $C_4$-fraction contains relatively large quantities of butadiene subsequently removed by known processes, the remaining $C_4$-fraction still has a higher butadiene content (residual butadiene) than is desirable or even acceptable for further use.

It is known that the butadiene or residual butadiene present in the $C_4$-fractions can be removed from them by selective hydrogenation in the liquid phase. In this selective hydrogenation process, most of the butadiene or residual butadiene is removed by hydrogenation whilst the butenes introduced (isobutene, n-but-1-ene and n-but-2-ene) remain largely unaffected. Butadiene-poor $C_4$-fractions such as these are frequently required to have a high n-but-2-ene content and a low n-but-1-ene content.

The present invention provides a process for the hydrogenation of $C_4$-hydrocarbons mixtures containing butadiene and n-but-1-ene, wherein butadiene-poor $C_4$-fractions with a high n-but-2-ene content and a low n-but-1-ene content are obtained by passing liquid butadiene-containing $C_4$-fractions with a relatively high n-butene content in a descending stream over a catalyst fixedly arranged in the reaction zone in a hydrogen atmosphere at an inlet temperature from 10 to 35° C. and an outlet temperature from 60 to 90° C.

It is possible, by virtue of the process according to the invention, to produce butadiene-poor $C_4$-fractions with a high n-but-2-ene content. Accordingly, it is of advantage to hydrogenate the $C_4$-hydrocarbon in such a way that, although most of the butadiene is hydrogenated, there is no appreciable hydrogenation of the butenes, i.e. butane is formed only in very small quantities. This can be done by appropriately varying the hydrogen pressure, temperature and throughput. A high hydrogen pressure, a quick rise in the reaction temperature and a low throughput of $C_4$-fraction results in fairly severe hydrogenation conditions. Depending upon the type of starting material used, the most suitable conditions for the particular starting material may readily be determined by a preliminary test. It is of advantage to remove as much as possible of the butadiene present in the $C_4$-fraction at the lowest possible temperature. Generally speaking, it is sufficient if the butadiene content is less than 0.1% by volume. It is, however, readily possible and of course of advantage, particularly with hydrocarbon fractions of low butadiene content, to reduce the butadiene content even further, for example, to 0.01% by volume, by employing suitable hydrogenation conditions. Whether the reaction conditions selected are the most favourable for the process according to the invention can generally best be established by determining the composition of the end product.

Butadiene-containing hydrocarbons containing mostly $C_4$-hydrocarbons are used for the process according to the invention. In general, the $C_4$-fractions used will have butadiene contents of 0.1 to 10% by volume. If the $C_4$-fractions used have considerably higher butadiene contents, for example, from 20 to 50% by volume, it is usually more advantageous substantially to reduce the butadiene content of these fractions by preliminary hydrogenation and then to use them for the hydrogenating treatment described herein. The $C_4$-fractions generally contain at least 15% by volume of n-but-1-ene.

It is preferred to use pressures which are sufficiently higher than the saturation pressure of the starting material used at the maximum temperature applied. In general, working pressures from 7 to 20 atms. are preferred. The quantity of hydrogen to be used for the reaction is in most instances a maximum of 20% above that quantity which is chemically combined. The hydrogenation reaction is thus largely carried out in a static hydrogen atmosphere. The hydrogen to be used should of course be free of any impurities likely to poison the hydrogenation catalyst, in particular sulphur compounds and carbon monoxide. The hydrogen gas used for the reaction should contain at least 50% by volume and with advantage more than 70% by volume of hydrogen. The hourly throughput of starting material through the reaction zone occupied by the catalyst is with advantage from 5 to 25 kg. per litre of reaction zone. The catalysts are fixedly arranged in the reaction zone. It is of advantage to use vertically arranged reactors through which the reactants flow in a descending stream. Accordingly, the liquid starting material passes through the layer of catalyst in the trickle phase. It has proved to be of particular advantage to divide up the reaction zone into individual tubes of from 25 to 75 mm. in internal diameter and from 1 to 8 metres in length, which are filled with catalyst and are surrounded externally by a heat-conducting medium. Distributing devices ensure that the liquid starting material is fed to the individual tubes in consistently the same quantity, whilst in most cases there is no need to distribute the quantity of hydrogen to be added to the individual tubes.

Metals of the VIIIth Group of the Periodic System are suitable hydrogenating components in the catalysts and, of these, palladium is particularly preferred, being supported on substrates, for example, in quantities from 0.01 to 1% by weight, advantageously 0.05 to 0.5% by weight. It has proved to be of advantage to impregnate the support with palladium in the form of its chloride in aqueous solution, and then to convert the palladium chloride thus applied into metallic palladium by treating it with reducing agents on the substrate. Hydrazine and formaldehyde have proved to be effective reducing agents.

Aluminium oxide and silica, for example, may be used as supports for the aforementioned hydrogenation catalysts. Silicates such as alminium silicates and magnesium silicates are also suitable for use as support for the palladium. Supports consisting completely or partly of spinel, lithium aluminium spinel in particular, have proved to be of particular advantage. The spinel content of the catalyst support is advantageously at least 20 and better still around 40% by weight and higher. Supports consisting completely of lithium aluminium spinel have proved to be really suitable. To produce the lithium aluminium spinel, it has proved to be of advantage to use highly active aluminium oxide with a specific surface of, for example, 200 to 300 m.$^2$/g. as the starting material, and to convert it into spinel by reaction with a compound of lithium. The aluminium oxide may be used in lump form, for example, in the form of chips, tablets or beads which are impregnated with a solution of a lithium compound, preferably salts and in particular salts of organic acids, especially the formate, or hydroxides. Spinel formation is obtained by heating for 1 to 10 hours at 900 to 1,300° C., optionally after intermediate thermal decomposition of the salt. Similarly, finely powdered aluminium oxide of the same kind may be used as the starting material, and the catalyst can be formed into any desired shape following impregnation or salt decomposition. Conversion into the spinel is then brought about by calcining. The catalyst supports thus obtained preferably have specific surfaces (as measured by the BET-method) of 10 to 200 m.$^2$/g. and, advantageously, from 20 to 60 m.$^2$/g. Their average pore diameter is preferably from 200 to 800 A. The palladium is advantageously applied to the support in the form of an aqueous solution of sodium palladium chloride, and the salt reduced to metallic palladium by reducing agents, for example, hydrazine, formic acid or formaldehyde. It is also possible to use other palladium salts, for example, the nitrate or acetate, and to carry out reduction at elevated temperatures, for example, at a temperature of 100 to 300° C. with gases containing hydrogen, optionally after the salts have been converted into oxides.

The supports used advantageously have specific surfaces of 5 to 100 m.$^2$/g., as measured by the BET-method. The catalysts usually have a useful life of several months. Catalysts which have lost some of their activity can quite easily be regenerated by passing oxygen-containing gases over them at temperatures in the range from 300 to 500° C.

In the process according to the invention, more than 80% and usually more than 95% of the butadiene present in the starting material is hydrogenated. The isobutene remains largely unaffected by this treatment. Normally, less than 10% of the n-butene present in the starting material is hydrogenated to n-butane. The n-but-2-ene content, based on the n-butene total, amounts to at least 60% and generally to at least 80%.

Further conversion of the residual n-but-1-ene into n-but-2-ene can be obtained by dividing the product of hydrogenation by fractional distillation into a tail product comprising n-but-2-ene and n-butane and a head product comprising n-but-1-ene, isobutene and isobutane. Some of this head product may be recycled into the reactor.

It is possible by adopting this procedure to obtain an n-but-2-ene fraction almost completely free from isobutene which may either be processed or further used. It is frequently desirable, for chemical reactions on the n-butenes to have available an n-butene fraction which is free from isobutene. This can be achieved in the manner described above. On the other hand, the concentration of isobutene present in the head product of fractional distillation is much higher than in the starting material. This, too, can be desirable for chemical reactions.

EXAMPLE 1

The catalyst was prepared by impregnating sintered 4-mm. aluminium oxide chips with palladium(II)chloride solution and reducing the palladium salt thus applied to the metal with hydrazine hydrate so that the catalyst contained 0.5% by weight of palladium. The support used had a specific surface as measured by the BET-method of 10 m.$^2$/g. The butadiene-containing C$_4$-fraction used as starting material was allowed to trickle downwards through a vertically arranged tubular reactor filled with catalyst in an almost static hydrogen atmosphere. The conditions selected and the composition both of the starting material and of the reaction products are shown in the following Table 1 (tests 1 and 2 are comparison tests).

REACTION CONDITIONS

| Test | 1 | 2 | 3 |
|---|---|---|---|
| Throughput in kg./litre volume/hour | 8 | 8 | 8 |
| Temperature, °C.: | | | |
| Inlet end | 20 | 20 | 20 |
| Outlet end | 20 | 40 | 70 |
| Pressure (atms.) | 15 | 7 | 9 |

ANALYSES IN PERCENT BY VOLUME

| | Starting material | Hydrogenation product from— | | |
|---|---|---|---|---|
| | | Test 1 | Test 2 | Test 3 |
| Butadiene | 1.5 | 0.15 | 0.05 | 0.01 |
| n-But-1-ene | 26.2 | 25.9 | 25.1 | 6.0 |
| n-But-2-ene | 17.3 | 17.4 | 17.9 | 35.0 |
| Isobutene | 45.5 | 45.5 | 45.5 | 45.5 |
| n-Butane | 7.7 | 9.2 | 9.6 | 11.7 |
| Isobutane | 1.8 | 1.8 | 1.8 | 1.8 |

EXAMPLE 2

The catalyst was prepared as follows:

Aluminium oxide in the form of beads 3 to 4 mm. in diameter with a specific surface of 230 m.$^2$/g. was impregnated with such a quantity of an aqueous solution of lithium formate that the impregnated and dried catalyst contained 2.6% by weight of lithium. This support was heated at 1,050° C. over a period of 4 hours, during which spinel formation was completed. The support thus consisted entirely of lithium aluminium spinel.

Palladium metal was applied to this support by impregnating the beads with an aqueous solution of sodium palladium chloride and precipitating the palladium with hydrazine hydrate, followed by washing and drying. The finished catalyst contained 0.1% by weight of palladium. The starting material described in Example 1 was passed over this catalyst in an almost static hydrogen atmosphere at an hourly throughput of 20 kg./litre of reactor and at an inlet temperature of 20° C. and an outlet temperature of 75° C. The pressure was 11.5 atms. The hydrogenation product thus obtained had the following composition (in percent by volume):

| | |
|---|---|
| Butadiene | 0.01 |
| n-But-1-ene | 6.3 |
| n-But-2-ene | 34.6 |
| Isobutene | 45.5 |
| n-Butane | 11.8 |
| Isobutane | 1.8 |

The product of hydrogenation was separated into the following fractions by fractional distillation:

| Ingredient (Percent by volume) | Tail product | Head product |
|---|---|---|
| Butadiene | | 0.02 |
| n-But-1-ene | | 11.7 |
| n-But-2-ene | 74.6 | |
| Isobutene | | 84.9 |
| n-Butane | 25.4 | |
| Isobutane | | 3.4 |

EXAMPLE 3

A zeolite in the form of chips and having a pore diameter of 13 A. was impregnated with an aqueous sodium-palladium-chloride solution and reduced with hydrazine hydrate. The finished catalyst contained 0.23% by weight of palladium and had a specific surface of 186 m.$^2$/g. A liquid butadiene-containing $C_4$-fraction was allowed to trickle downwards over a fixed bed of this catalyst in an almost static hydrogen atmosphere. The hourly throughput was 15 kg. $C_4$/litre of catalyst. The inlet temperature was 15° C., the outlet temperature was 60° C. and the pressure was 10 atms. The analyses of both the starting material and the product of hydrogenation are given in the following Table 2:

ANALYSES IN PERCENT BY VOLUME

| | Starting material | Product of hydrogenation |
|---|---|---|
| 1,3-butadiene | 1.8 | 0.01 |
| n-But-1-ene | 27.6 | 4.0 |
| n-But-2-ene | 16.5 | 36.5 |
| Isobutene | 45.2 | 45.2 |
| n-Butane | 7.2 | 12.5 |
| Isobutane | 1.7 | 1.7 |

EXAMPLE 4

A silica support in bead form (3–4 mm. diameter) was impregnated with a sodium-palladium-chloride solution and reduced with hydrazine hydrate. The thus prepared catalyst contained 0.17% by weight of palladium and had a specific surface of 96 m.$^2$/g. The liquid $C_4$-fraction described in Example 3 was passed over this fixed-bed catalyst in an almost static hydrogen atmosphere. The hourly throughput was 20 kg. $C_4$/litre of catalyst. The temperature at the inlet end of the reactor was 20° C. and at its outlet end the temperature was 60° C. The pressure was 10.5 atms. The product of hydrogenation had the following composition (in percent by volume):

| | |
|---|---|
| 1,3-butadiene | 0.02 |
| n-But-1-ene | 11.9 |
| n-But-2-ene | 29.6 |
| Isobutene | 45.2 |
| n-Butane | 11.6 |
| Isobutane | 1.7 |

What we claim is:

1. In the hydrogenation of $C_4$-hydrocarbon fractions containing n-but-1-ene and butadiene by passing such into contact with a hydrogenation catalyst which is a metal of the VIII Group of the Periodic System in the presence of a hydrogen atmosphere to produce a product which is high in n-butene and poor in butadiene; the improvement whereby simultaneously isomerizing n-butene-1 in said fractions and produced in said hydrogenation to n-butene-2, which comprises passing said $C_4$-hydrocarbon mixture in the liquid state downwardly over a fixed bed hydrogenation catalyst in a hydrogen atmosphere at an inlet temperature of said $C_4$-hydrocarbon mixture of about 10 to 35° C. and at an outlet temperature of the hydrogenated and isomerized product of 60 to 90° C.

2. A process as claimed in claim 1, wherein the hydrogen pressure inside the reaction zone is regulated so that most of the butadiene is hydrogenated, whilst butane is only formed in small quantities.

3. A process as claimed in claim 1 wherein the butadiene content is reduced to less than 0.1% by volume.

4. A process as claimed in claim 1 wherein the butadiene-containing $C_4$-fraction is passed over the catalyst at an hourly throughput of 5 to 25 kg./litre of reaction zone.

5. A process as claimed in claim 1 wherein said catalyst is on a support and, is used as the catalyst in a quantity from 0.01 to 1% by weight.

6. A process as claimed in claim 5, wherein the quantity of the metal content is from 0.01 to 1% by weight.

7. A process as claimed in claim 5 wherein the metal is palladium.

8. A process as claimed in claim 5, wherein the support has a specific surface of 10 to 100 m.$^2$/g. are used.

9. A process as claimed in claim 5 wherein the support contains at least 20% of lithium aluminium spinel.

10. A process as claimed in claim 1 wherein the product of hydrogenation is separated by distillation into a tail product comprising n-but-2-ene and n-butane, and a head product comprising n-but-1-ene, isobutene and isobutane, some of the head product being recycled to the reactor in which hydrogenation takes place.

References Cited

UNITED STATES PATENTS

| 3,113,983 | 12/1963 | Kirsch et al. | 260—677 |
| 2,946,829 | 7/1960 | Likins et al. | 260—677 |
| 3,373,219 | 3/1968 | Kronig et al. | 260—681.5 |
| 3,291,755 | 12/1966 | Haensel et al. | 252—464 |
| 3,290,404 | 12/1966 | Howman et al. | 260—683.2 |
| 2,960,551 | 11/1960 | Feller | 260—683.2 |

DELBERT E. GANTZ, Primary Examiner

J. NELSON, Assistant Examiner

U.S. Cl. X.R

260—683.2, 683.9